(12) United States Patent
Murali

(10) Patent No.: US 10,292,104 B2
(45) Date of Patent: May 14, 2019

(54) QUICK DECISION PREAMBLE DETECTOR WITH HIERARCHICAL PROCESSING

(71) Applicant: Redpine Signals, Inc., San Jose, CA (US)

(72) Inventor: Partha Sarathy Murali, San Jose, CA (US)

(73) Assignee: Redpine Signals, Inc., San Jose, CA (US)

( * ) Notice: Subject to any disclaimer, the term of this patent is extended or adjusted under 35 U.S.C. 154(b) by 62 days.

(21) Appl. No.: 15/682,541

(22) Filed: Aug. 21, 2017

(65) Prior Publication Data

US 2019/0059055 A1 Feb. 21, 2019

(51) Int. Cl.
*G08C 17/00* (2006.01)
*H04W 52/02* (2009.01)
*H04L 1/00* (2006.01)

(52) U.S. Cl.
CPC ....... *H04W 52/0229* (2013.01); *H04L 1/0039* (2013.01)

(58) Field of Classification Search
CPC .............. H04W 52/0229; H04L 1/0039
See application file for complete search history.

(56) References Cited

U.S. PATENT DOCUMENTS

| | | | |
|---|---|---|---|
| 4,773,083 A | 9/1988 | Baumbach et al. | |
| 6,647,077 B1 | 11/2003 | Shan et al. | |
| 7,548,579 B1 | 6/2009 | Murphy et al. | |
| 2002/0159540 A1 | 10/2002 | Chiodini | |
| 2003/0147374 A1* | 8/2003 | Chiu | H04L 7/042 370/349 |
| 2004/0228424 A1* | 11/2004 | Baldwin | H04W 52/0229 375/343 |
| 2004/0240588 A1 | 12/2004 | Miller | |
| 2007/0140296 A1* | 6/2007 | Koppelaar | H04B 1/69 370/470 |
| 2018/0048499 A1* | 2/2018 | de Ruijter | H04L 27/0012 |

* cited by examiner

*Primary Examiner* — Minh Trang T Nguyen
(74) *Attorney, Agent, or Firm* — File-EE-Patents.com; Jay A. Chesavage

(57) ABSTRACT

A wireless receiver has a preamble detection apparatus and method which waits until the expected arrival of a beacon frame, after which power is cyclically applied during a preamble detection interval and a sleep interval until a preamble is detected. The preamble detector has a first mode with a longer preamble detection interval and a second mode with a shorter preamble detection interval. During the preamble detection interval, power is applied to receiver components, and during the sleep interval, power is not applied. The duration of the preamble detection interval is equal to a preamble sensing interval, and if a preamble is detected, power remains applied to a preamble processor for a preamble processing interval. The duration of the sleep interval is the duration of a long preamble less the sum of two times the preamble detection interval plus the preamble processing interval. Phase lock loop (PLL) power is applied a PLL settling time prior to and during the preamble detection interval.

10 Claims, 11 Drawing Sheets

Access Point, Stations, Infrastructure Mode

Congestion-free AP beacons, STA wake-up, and transmit window

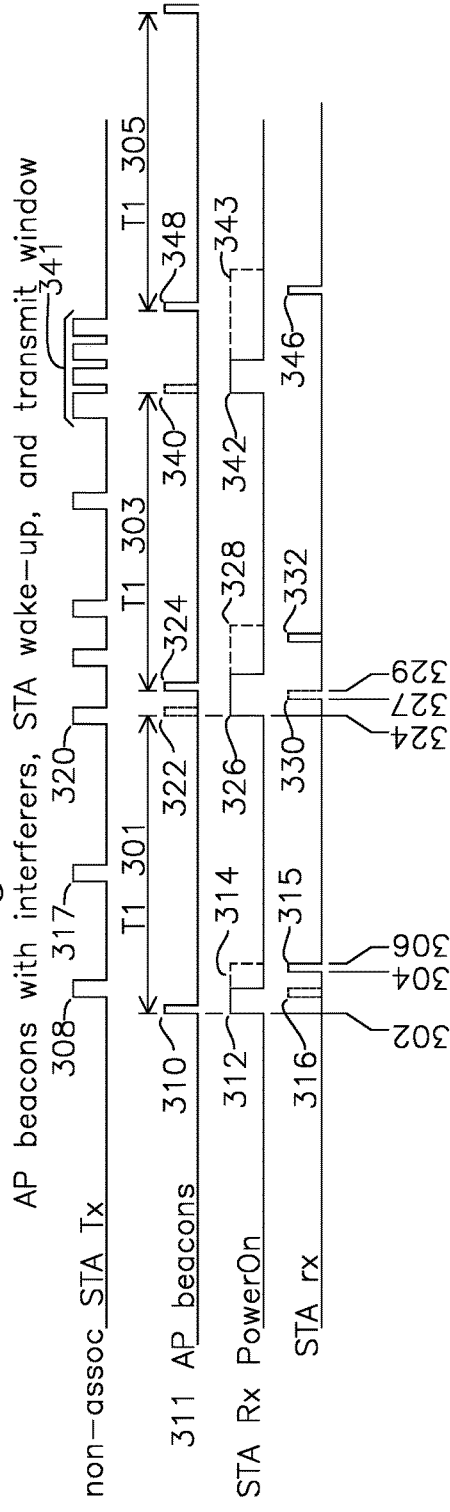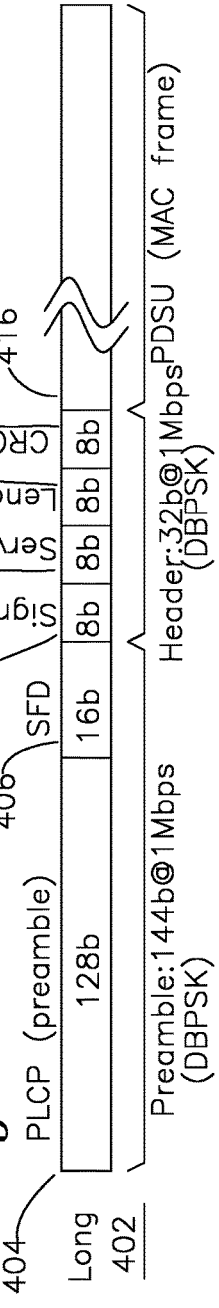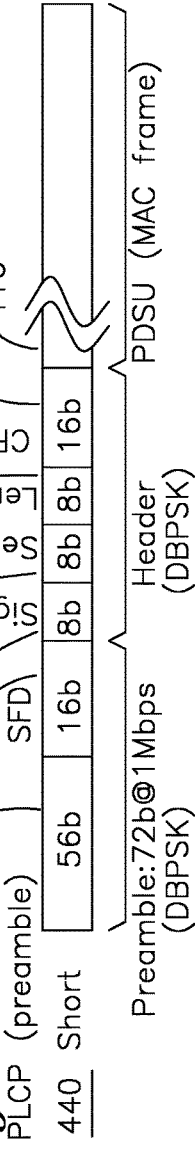

Receiver Preamble Detection sequence

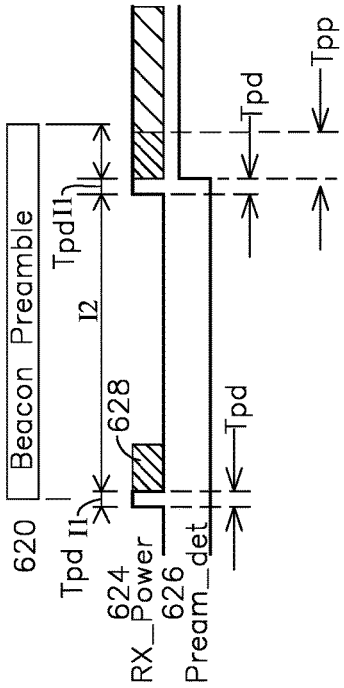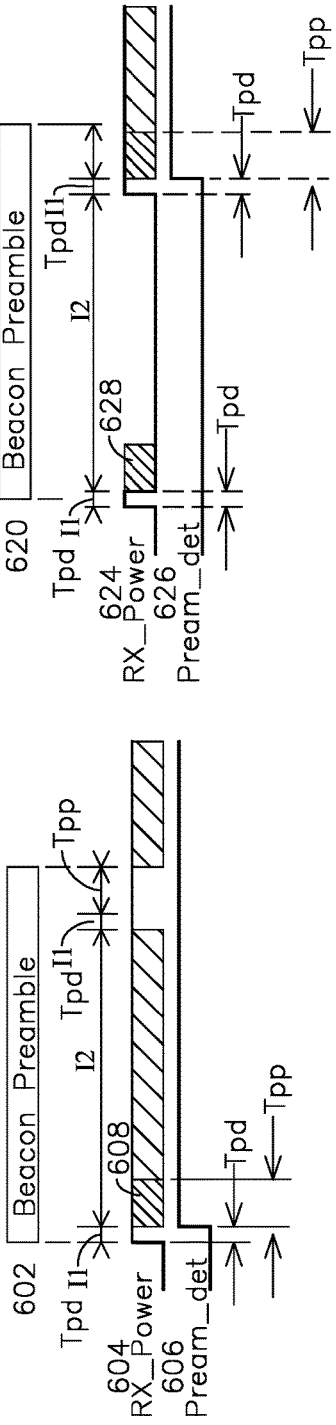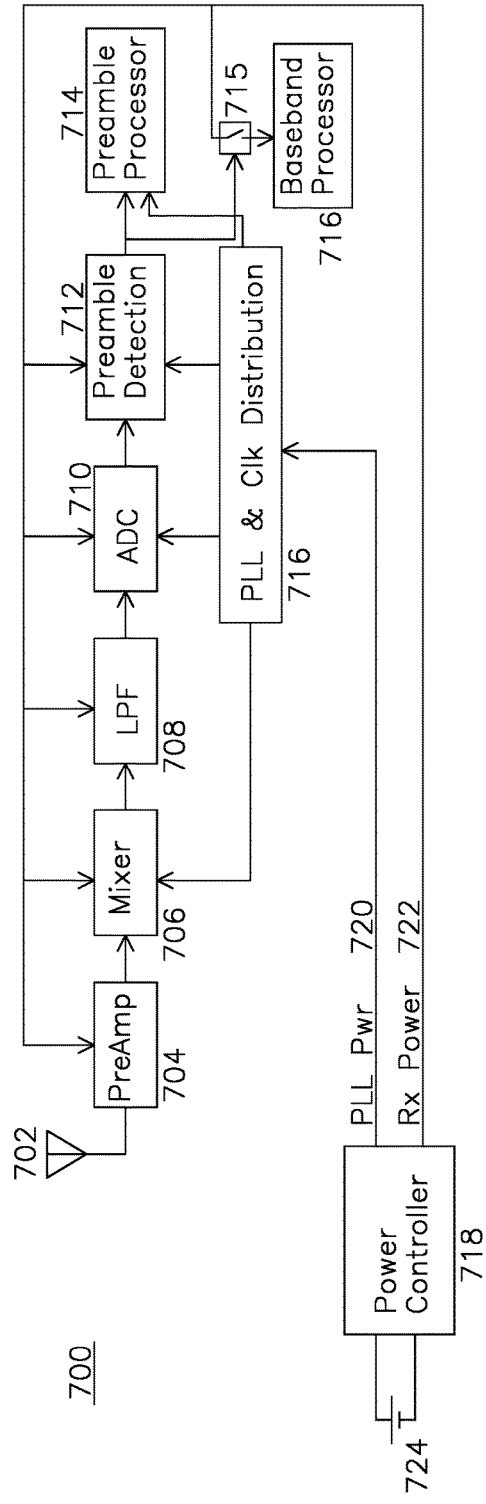

Beacon Detect Process

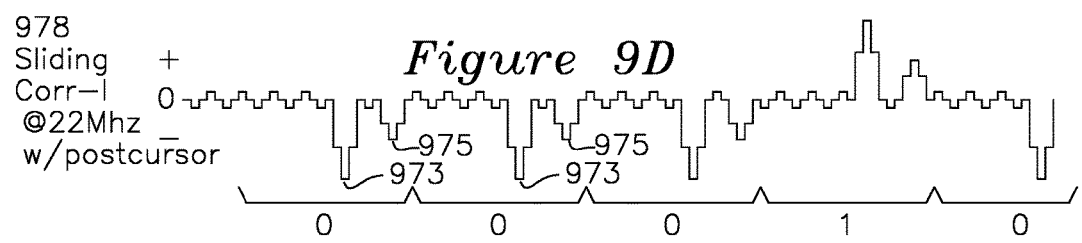
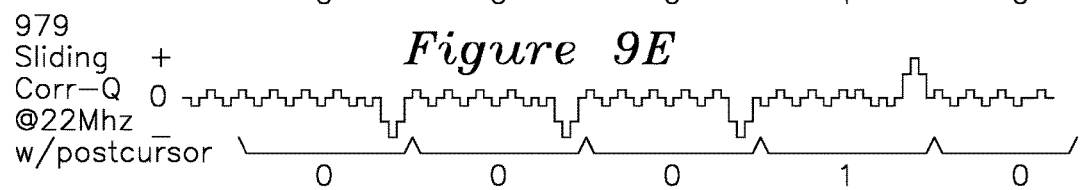
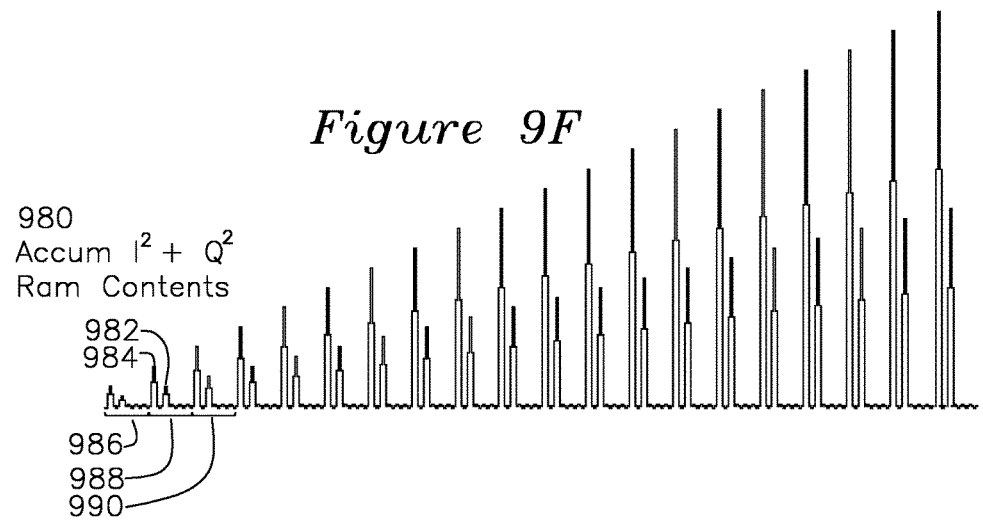

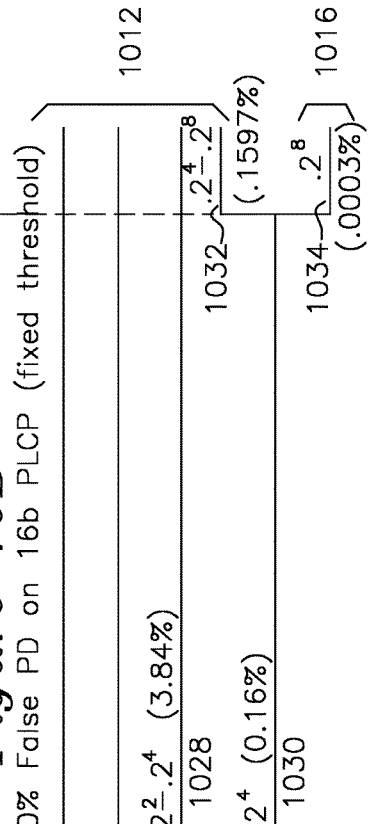
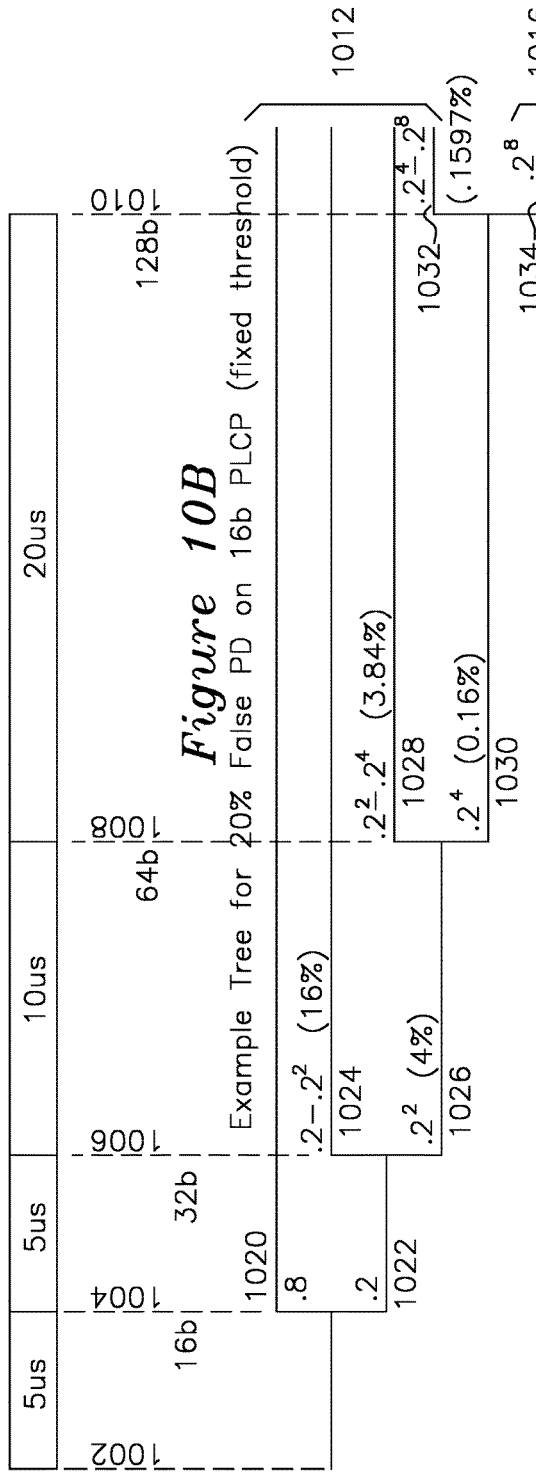
*Figure 10A* PLCP Preamble
*Figure 10B* Example Tree for 20% False PD on 16b PLCP (fixed threshold)
*Figure 10C*
For Corr_threshold set to 20% FA on 16 bits of PLCP
| #bits PLCP | Likelihood of False Alarm |
|---|---|
| 55cp/5us | $0.2 = 20\%$ |
| 110cp/10us | $0.2*0.2 = 4\%$ |
| 220cp/20us | $0.2*0.2*0.2*0.2 = 0.16\%$ |
| 440cp/40us | $0.2^8 = .00003\%$ |
*Figure 10D*
Avg time PD function is enabled:
$5us*(1)+5us*(.2)+10us*(.04)+20us*(.0016)$
$=6.432us$ avg (1.432 us beyond 1st 5us)

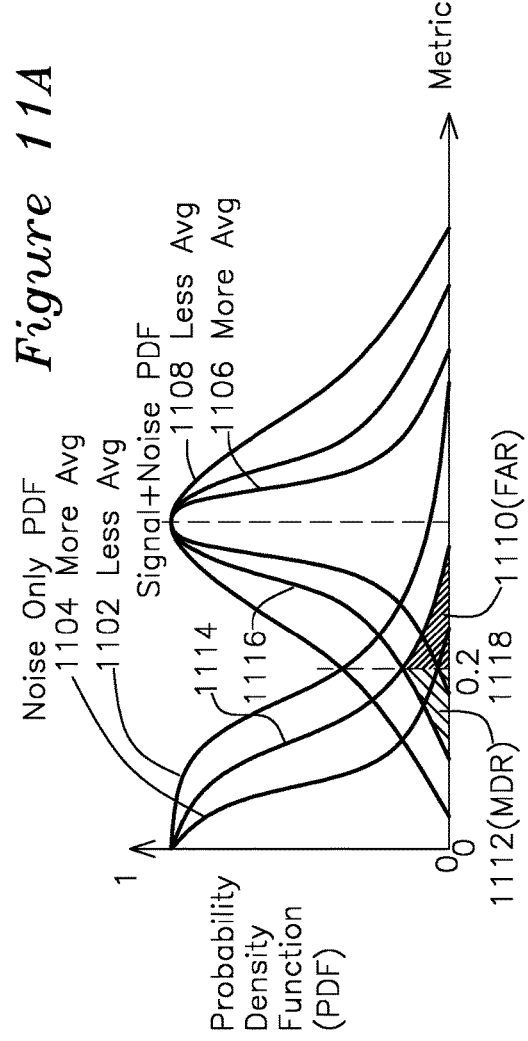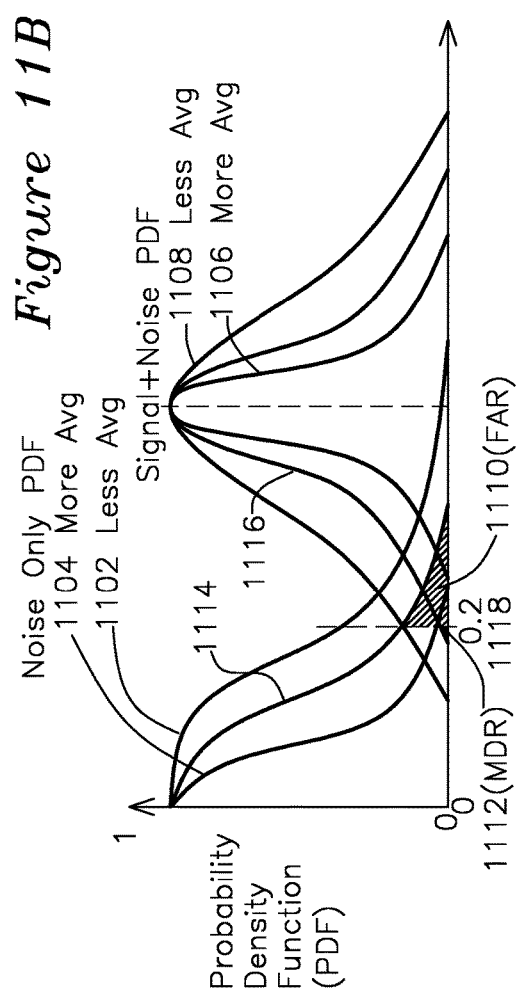

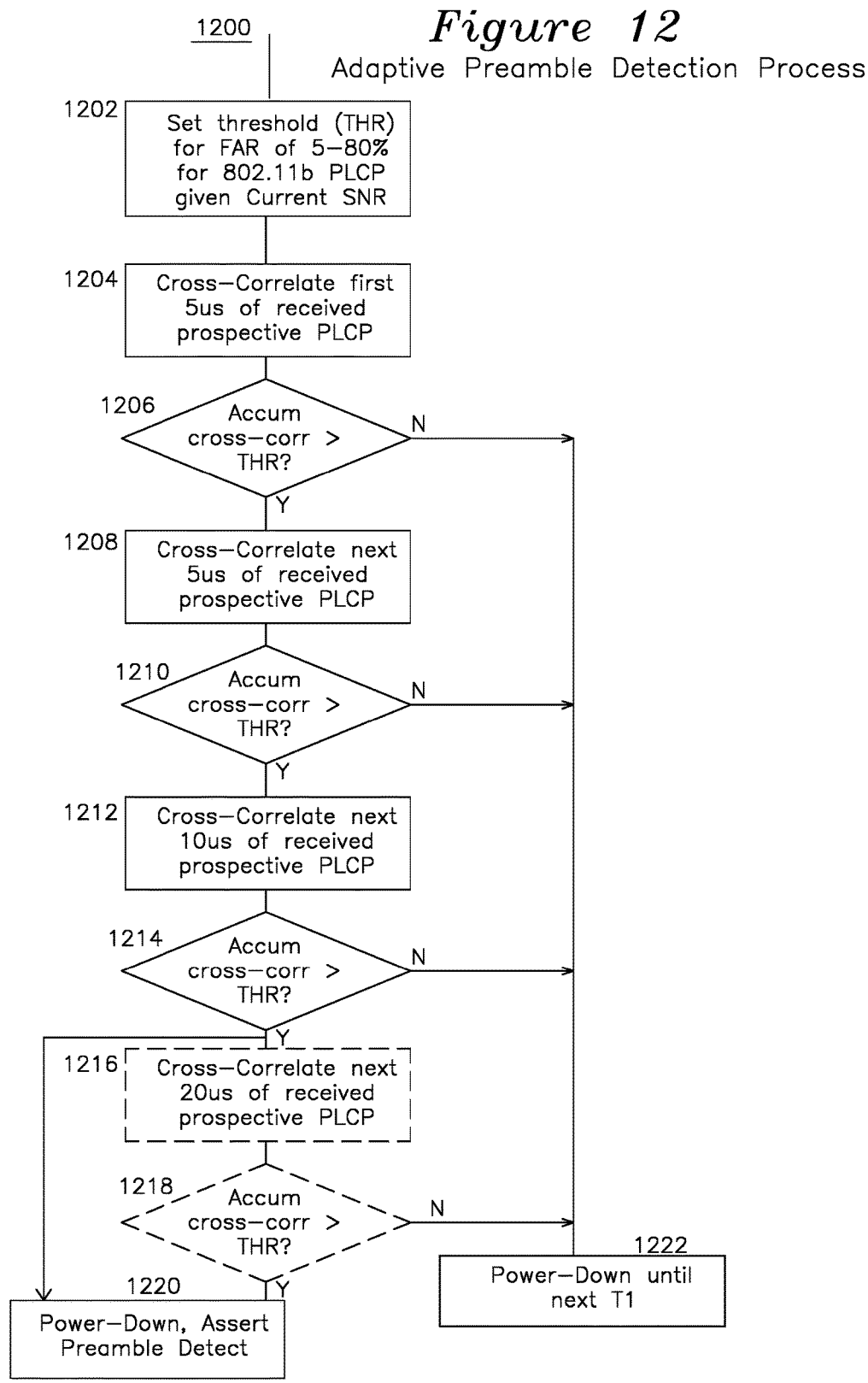

QUICK DECISION PREAMBLE DETECTOR WITH HIERARCHICAL PROCESSING

FIELD OF THE INVENTION

The present invention relates to an apparatus and method for low power preamble detection in a receiver which is in a power-down mode but which periodically wakes up to respond to periodic beacons which define available receive or transmit intervals.

BACKGROUND OF THE INVENTION

Under the wireless local area network (WLAN) IEEE Standard 802.11, wireless stations (STA) and access points (AP) may operate in an infrastructure mode. Infrastructure mode defines a set of communication protocols, one of which is an association protocol for a station to join an access point, another of which provides for an access point which operates continuously to periodically communicate with a station which has the characteristic of being in a power-down (sleep) mode, where the station periodically is activated into a power-up (wake-up) state to receive a Delivery Traffic Indication Map (DTIM) which indicates whether there are packets to be transmitted to the newly-awakened station from the AP. This DTIM power-save protocol conserves a significant amount of station power by only consuming power when the station is in a power-up state (the interval when power is applied to the receiver circuits) shortly prior to the expected arrival of a beacon frame, throughout the beacon frame, and where the power-up state occurs during defined intervals related to periodic beacon intervals. A typical beacon interval is 100 ms. In one example prior art embodiment, the wireless AP transmits a frame known as Delivery Traffic Indication Map (DTIM) and the STA responds indicating how often the station will wake up to check the beacon frame to receive or transmit to the AP. According to the 802.11 power-save protocol for stations, the station is in a power-up state shortly prior to the expected arrival of the AP beacon frame, and the STA stays remains powered on long enough during this throughout the beacon interval to determine whether the traffic indication map (TIM) of the beacon frame indicates there are receive packets destined to the AP, and if so, the station STA remains in a power-up state until the packets are received from the AP, as indicated by the TIM. A prior art station also remains powered up until the arrival of a beacon frame. The TIM includes a header part indicating station assignments and a bitmap part indicating whether a particular station has traffic to receive.

A problem arises in congested networks, where the STA may wake up at the appointed beacon interval, but the beacon frame is delayed in transmission by the transmitting AP because of network congestion (such as from an associated station transmitting, same-channel interference, or a station or other access point on the same WLAN channel is nearby and interfering), in which case the AP waits for a clear channel before transmitting the beacon frame. During either of these disruptions, the STA remains powered up and awaiting reception of the delayed WLAN beacon frame, causing unwanted power consumption. Additionally, each beacon frame must be received and the TIM examined to determine whether the AP has a packet to transmit to the station, including during long intervals where there are no packets to be received from the AP. It is desired to provide a power saving apparatus and method which provides improved power savings in a station operative in congested networks where the station wakes up and the expected beacon is delayed because of network congestion or interferers, and to provide an apparatus and method for reducing receiver power consumption during beacon frame reception.

Another problem for stations infrequently receiving packet traffic is that the power consumed during the time the station is in a wake-up state and waiting for a delayed beacon frame to arrive may be the primary power drain for the station receiver. In this circumstance, the time required to accurately detect the beacon preamble becomes a significant power drain. Accordingly, it is desired to reduce the power consumption of the station during the duration of time waiting for a delayed packet such as a beacon frame.

OBJECTS OF THE INVENTION

A first object of the invention is an apparatus and method for reduced power consumption in the periodic power-up of a wireless station at a beacon wakeup time for reception of a beacon frame, whereby:

upon the expected arrival of a beacon frame, the station enters into a repetitive series of preamble detect cycles, each preamble detect cycle operative on a preamble detector and comprising a preamble detection interval followed by a sleep interval;

the preamble detector operative for a series of intervals of a conditional hierarchy, each interval of shorter duration than required to reliably detect a preamble;

where power is applied to a phase lock loop delivering at least one clock to the preamble detector (PLL) a PLL settling time prior to each preamble detection interval and also throughout the preamble detection interval;

each sleep interval having a duration equal to a preamble duration minus the sum of two times the preamble detection interval plus a preamble processing interval;

where power is applied to the preamble detector during the preamble detection interval and when a preamble is present, power remains applied to the preamble detector and also a preamble processor;

and where power is removed from the PLL, preamble detector, and preamble processor during the sleep interval.

A second object of the invention is a process for power-up of a wireless receiver receiving beacon frames operative on a receiver having RF components, PLL components, a preamble detector, and a preamble processor, the PLL components having a settling time, the preamble detector having a preamble sensing interval, and the preamble processor having a preamble processing interval, the process comprising:

identifying an expected preamble arrival time;

repetitively cycling power on during a preamble detection interval and off during a sleep interval, where during the preamble detection interval power is applied to the RF components and preamble detector, and where during the sleep interval, power is removed from the RF components and preamble detector;

and where power to the PLL components is applied a PLL settling time prior to the preamble detection interval and also throughout the preamble detection interval, and power to the PLL components is removed during the sleep interval;

the preamble detection interval comprising a preamble sensing time;

the sleep interval being substantially equal to a preamble duration less two times the preamble sensing time and less a preamble processing time;

the preamble detector operative for a series of time intervals of a conditional hierarchy, at least one time interval being a shorter duration of time than the duration of time required for reliable detection of a preamble;

and where a preamble processor is powered on during the preamble detection interval and is also powered on during the preamble processing time if a preamble is sensed.

A third object of the invention is a process for detection of a preamble of a beacon frame, the process comprising:

identifying an expected beacon frame arrival time;

a preamble search step where power is repetitively applied to PLL components a PLL settling time prior to the preamble detection interval, and where during the preamble detection interval, power is applied to RF components, preamble detector components, and preamble processor components, after which power is removed from the PLL components, RF components, preamble detector components and preamble processor components during a sleep interval which follows the preamble detection interval;

the preamble detector operative for at least one shortened interval of time compared to the interval of time required for a reliable preamble detection;

and where the sleep interval is equal to or less than a preamble duration less the sum of two times the preamble detection interval and a preamble processing interval;

and where, upon detection of a preamble for a beacon frame, power remains applied to the PLL components, RF components, packet detection components and preamble processor until the end of the beacon frame.

A fourth object of the invention is a preamble detector which is cyclically operative to perform an in-phase cross correlation of a received PLCP with a template PLCP and a quadrature cross correlation of a received PLCP with a template PLCP, the in-phase cross correlation and quadrature cross correlation results squared and summed into a linear accumulator over a canonical fixed interval equal to the PLCP interval, the peak accumulated result compared to a non-peak accumulated result for a first interval, if a first interval threshold value is not exceeded, powering down the preamble detector, otherwise continuing the accumulation and comparison for a second interval approximately equal to the first interval, and if the threshold value is exceeded at the end of the second interval, continuing the accumulation and comparison for a third interval approximately equal to the sum of the first and second interval durations, and if the accumulated result of the cross correlation at the end of the third interval exceeds a threshold, asserting preamble detect, otherwise powering down until a subsequent cycle, the preamble detector threshold selected to have less than a 50% rate of false alarm rate (FAR) and more than 1% FAR for a preamble detection using only the first interval.

A fifth object of the invention is an energy efficient preamble detector operative on a linear array of values, each value formed from the sum of the square of the cross correlation of an in-phase channel with a PLCP preamble plus the square of the cross correlation of a quadrature-phase channel over the duration of a PLCP preamble interval, the preamble detector having an accumulator with a length equal to a PLCP template used for the cross-correlation, the accumulator forming an accumulated sum of each value of the linear array of values, the accumulated sum having a peak value which is compared to a threshold during a first interval equal to a first plurality of PLCP intervals, the accumulation continuing for a second interval if the threshold is not exceeded during the first interval, the accumulation continuing for a third interval if the threshold is not exceeded during the second interval;

where the threshold over the first interval is set for a false packet detection rate of greater than 1% and less than 50%, the packet detector asserting a preamble detect output and powering down the preamble detector for the remainder of the preamble if the threshold is exceeded during or at the end of the third interval.

SUMMARY OF THE INVENTION

A wireless station receives beacon frames at periodic intervals from which an expected beacon arrival may be determined. A series of preamble detection cycles is initiated until a preamble is detected, each preamble detection cycle comprising a preamble detection interval followed by a sleep interval. In at least one of: a low signal to noise condition, low RSSI condition, or high multipath reflection condition, the packet detector operates using a shorter detection interval than required for reliable packet detection. Power is applied to phase locked loop (PLL) clock distribution a PLL settling time prior to each preamble detection interval and throughout the preamble detection interval. Power is applied to a receiver and preamble detector during the preamble detection interval, and power is removed from the receiver, preamble detector, and PLL during the sleep interval. The receiver includes RF circuits which receive and amplify the wireless packet, convert the packet to baseband symbols by mixing with a local oscillator at a carrier frequency, and present the symbol stream to a preamble detector for detection of preamble symbols and subsequently to a preamble processor for extraction of preamble characteristics if a preamble is detected. The duration of the preamble detection interval is equal to a preamble sensing interval, and the duration of the sleep interval is equal to the duration of a preamble less the sum of twice the duration of the preamble detection interval plus the duration of the preamble processing interval. By dividing the preamble sensing interval into a series of sub-intervals, the preamble sensing interval may be minimized through early termination and powerdown during low signal or high interference conditions, the preamble detector of the invention consumes less power than if the preamble sensing intervals were of fixed length. The preamble detector consumes less power when the preamble detector is disabled during a sub-interval of time than would be required for reliable preamble detection, even in the presence of increased false packet detect events from the shortened preamble detection interval.

A method for a wireless station has a first step of listening for a preamble of a wireless packet using a receiver and a preamble detector, whereby only the receiver and preamble detector are cyclically powered up for a first (detection) interval and powered down for a second (sleep) interval, the first detection interval substantially equal to the duration of a preamble sensing interval which is substantially equal to the time required for the receiver to reach an operational state after application of power, to perform AGC operations, and to detect the presence of a preamble. The preamble sensing interval is of variable length, and is divided into a series of preamble sensing interval which may terminate preamble detection under certain conditions. If a preamble is detected at the final preamble sensing interval, preamble detect is asserted and a preamble processor extracts parameters required by a baseband processor for demodulation of the packet. The second sleep interval is substantially equal to the duration of a wireless packet preamble less the sum of two times the first interval plus the duration of a wireless preamble processing interval. The use of a shortened and high false alarm rate over a hierarchy of successive preamble sensing intervals to disqualify a nonexistent, low signal to noise, or high interference preamble early in the preamble detect cycle results in a longer sleep interval, providing overall reduced power consumption.

A preamble detector starts in a reset condition and receives a series of samples of in-phase received PLCP preamble and quadrature-phase received PLCP preamble, and performs a cross correlation of the in-phase received PLCP preamble with a PLCP template and also the quadrature-phase received PLCP preamble which is correlated with the PLCP template, the in-phase correlation result and quadrature correlation result each separately squared and then summed to form a plurality of values with a time extent equal to the time extent of the PLCP preamble. The plurality of values may thereby be repetitively and canonically accumulated on a sample by sample basis for each PLCP extent such that the correlation peaks will accumulate coherently and the noise will add incoherently over the PLCP extent. The preamble detector continues to operate for a first interval equal to a multiple of elemental PLCP symbols (such as a storage location in the cross-correlation accumulator corresponding to each of the 11 bits of a barker code for 802.11b), and the largest accumulated peak value is compared to the surrounding noise or to a second or subsequent largest accumulated peak value, and packet detection is asserted when the largest accumulated peak value exceeds a threshold, after which the packet detector is disabled with packet detect asserted. If the accumulated peak at the end of a first interval does not exceed the threshold, then the accumulation continues for a second interval which may be substantially equal to the first interval. If the accumulated peak value exceeds the threshold at the end of the second interval, packet detect is asserted and the packet detector is disabled. If the comparison does not exceed the threshold at the end of the second interval, then the accumulation continues for a third interval which may be substantially equal to the first interval plus the second interval. If the accumulated peak value exceeds the threshold at the end of the third interval, packet detect is asserted and the packet detector is disabled. If the accumulated peak value does not exceed the threshold at this point in time, then either the process continues for a fourth interval, or preferably the packet detector is reset and disabled until a subsequent preamble detection cycle, the preamble detection interval substantially equal to the preamble interval less two times the preamble detection time (Tpd), less the preamble processing time (Tpp).

Alternatively, where the PLCP preamble has length n, the correlation values from the sum of the square of the in-phase and quadrature correlation results may be used to generate an accumulated result such that if no preamble is detected by comparison of the accumulated cross correlation peaks with a first interval threshold during a first interval of m*n bits, the cross correlation accumulation continues for a second interval of m*n bits, if no preamble is detected at that time, the cross correlation accumulation continuing for a third interval of 2 m*n bits, and if a preamble is not detected at that time, the cross correlation accumulation continuing for an optional additional 4 m*n bits. The detection of a preamble and assertion of a preamble detect output occurs after any of: the maximum (peak) value of the accumulated correlation result exceeds a threshold, a maximum peak accumulated value exceeds one or more other non-maximum peak accumulator values, or alternatively, the maximum accumulator peak value exceeds a non-peak (background noise) level of the accumulator. At the end of each interval, if the threshold is not exceeded, then a comparison is performed again during each subsequent interval until a given number of intervals have occurred, which qualifies as a preamble detect event. The preamble detect process is alternatively terminated and preamble detector powered down upon the first interval for which the accumulator preamble peak does not exceed the threshold. Accordingly, a maximum (peak) accumulated value of the cross-correlation result during the first interval, second interval, or third interval which does not exceed the threshold results in powering down the preamble detector without asserting preamble detect output at the earliest interval where the cross-correlation peak fails to exceed the threshold, whereas a cross-correlation peak which exceeds the threshold in the final interval (the final interval being typically the third, or alternatively any subsequent interval occurring approximately 20 us from start of preamble detect) results in asserting a preamble detect output and typically powering down the preamble detector after preamble detect assertion. Following a preamble detection event, the start of frame delimiter (SFD) or other subsequent frames may be optionally detected to verify the preamble detection is correct and is not a false preamble detection event. Rather than averaging over a long preamble and comparing to a threshold for preamble detection of the prior art, the present invention establishes the preamble detection threshold to between 1% and 50% false preamble detection rate over an example interval length such as 5 us, which is less than an 802.11b preamble duration. By performing the preamble detection using a comparison between a threshold and the accumulated cross-correlation result, and conditionally continuing to the next interval only when the accumulated corss correlation peak exceeds a threshold set for a high FAR for the shortest interval the preamble detection duration is significantly shortened for non-preamble sample intervals, resulting in lower power dissipation and longer battery life.

BRIEF DESCRIPTION OF THE DRAWINGS

FIG. 3 is a timing diagram for a station operating in infrastructure mode with an access point with wireless interferers.

FIG. 4A is a diagram showing the fields of an 802.11 Wireless Local Area Network (WLAN) packet with a long preamble, such as a beacon frame.

FIG. 4B is a diagram showing the fields of a WLAN packet with a short preamble.

FIG. 6A is a timing diagram for early detection of a preamble.

FIG. 6B is a timing diagram for late detection of a preamble.

FIG. 7 shows the block diagram for a receiver and baseband processor operating according to an example of the present invention.

FIGS. 9A, 9B, 9C, 9D, and 9E, and 9F show waveform plots for the operation of the packet detector of FIG. 9.

FIG. 10A shows a diagram of PLCP Preamble intervals.

FIG. 10B shows a result tree for FIG. 10A with example outcome likelihoods for preamble detection.

FIG. 10C shows a table of likelihoods for PLCP correlations exceeding a threshold for various cross correlation PLCP lengths.

FIG. 10D shows a computation of average PD time based on the examples of FIGS. 10A, 10B, and 10C.

FIG. 11A shows plots of probability density functions for different levels of averaging for noise only and signal plus noise for a low signal strength case.

FIG. 11B shows plots of probability density functions for different levels of averaging for noise only and signal plus noise for a low signal strength case.

FIG. 12 shows a flowchart for a preamble detect algorithm operative on a preamble detector.

DETAILED DESCRIPTION OF THE INVENTION

Figure 1:
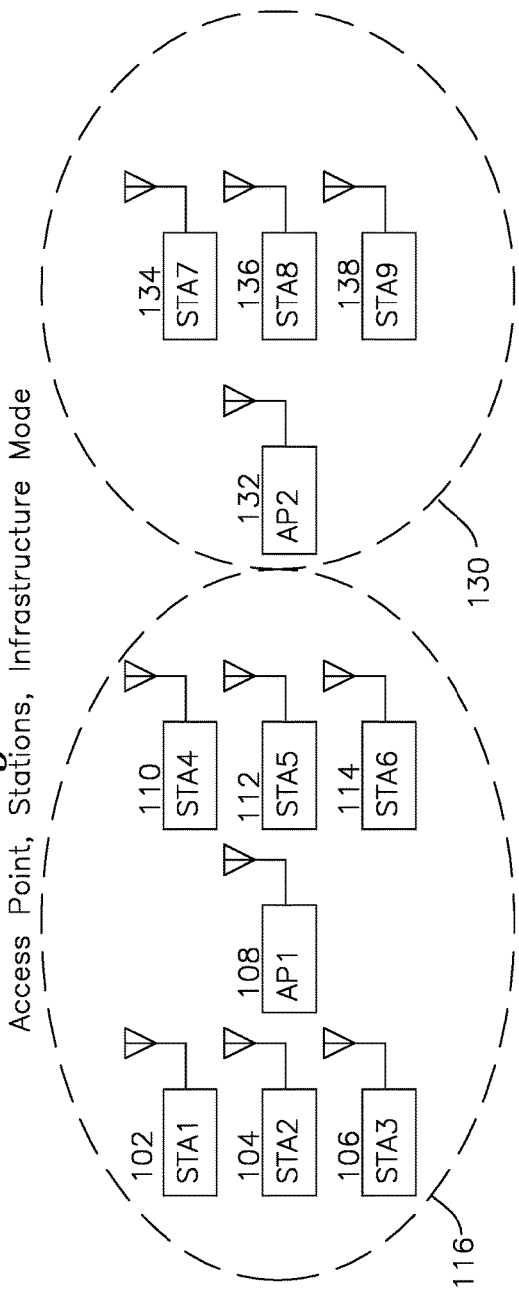
FIG. 1 shows a block diagram of access points and associated stations in an infrastructure mode.

The present invention is operative in wireless local area networks (WLAN) operative using the protocols of IEEE 802.11, which are understood to include wireless networks which are compatible with or interoperable with the IEEE 802.11-2012 and predecessor 802.11 standards.

Applicant identifies the following terminology for use in understanding the invention:

A receiver is understood to be any electronic circuitry which can be energized into a power-on state or de-energized into a power-down state for receiving wireless packets and amplifying them. The receiver may include automatic gain control (AGC) operations and the assertion of a preamble detect output as part of preamble sensing. When a preamble is detected, preamble processing occurs which may also optionally include performing channel equalization, center frequency offset correction, and rake training prior to digitization and presentation to a baseband signal processor for demodulation of the packet which follows the preamble. Typically, the receiver also includes a pre-amplifier, a baseband mixer, low pass filters, and analog to digital converter (ADC) with an output coupled to a preamble sensor and preamble processor, and the preamble processor delivers the extracted channel equalization and frequency offset parameters to the baseband processor for demodulating the associated packet. During the preamble sensing interval, the receiver performs automatic gain control (AGC) to place the signal into a suitable dynamic range of the ADC during the preamble interval of a received packet.

A preamble detector is coupled to a receiver which accepts a wireless signal and provides it to the preamble detector as a digitized quadrature baseband signal, the preamble detector asserting a preamble detect output upon detection of the preamble part of the wireless packet, which signals the preamble processor to perform channel estimation, resulting in the generation of what is known as an H_matrix, the preamble processor also providing information about the relative phase and gain corrections to be applied to the individual subcarriers, including center frequency offset (CFO), symbol timing, and rake training prior to packet demodulation, which is performed by the baseband processor.

The preamble detector of the present invention is operative over a PLCP preamble having a duration, the PLCP preamble divided into a plurality of intervals. A cross correlation result is formed between the incoming stream of PLCP preamble symbols and a PLCP template, such that a peak is formed at the point of time when the PLCP template matches the incoming PLCP preamble. The cross correlation is performed over a duration equal to the duration of a single preamble symbol in the PLCP stream, and the cross correlation results are added to the results previously stored in a cross correlation accumulator.

Various parts of a wireless receiver may accept a variety of clock signals which are derived from a phase lock loop (PLL) oscillator, and the PLL typically has a settling time after power up before the clock signals are usable for the associated required functions.

The present apparatus and method includes determining the expected arrival of a beacon frame having a preamble, where the apparatus and method includes a preamble detection state when a WLAN packet preamble is received and a preamble detector which asserts a preamble detect output when a preamble is detected, typically in a processing time of substantially 10 us for a comparatively high SNR or high received signal strength indicator (RSSI) or low multi-path reflection environment, versus substantially 20 us for a comparatively low SNR or RSSI, or high multi-path reflection environment. If a preamble is detected, power remains applied afterwards to the preamble processor for approximately 28 us for preamble processing to occur, including the extraction of at least a channel estimate, center frequency offset, or rake training. If no preamble is detected, power is removed from the preamble processor and preamble detector until the subsequent preamble detection cycle occurs.

All wireless packets begin with a preamble sequence in the first segment of a wireless packet, which for a 802.11 WLAN packet is typically transmitted at a bit rate of $10^6$ bits per second (BPS), referred to as 1 MBPS, and the preamble may be "short" or "long" as described in FIGS. 4A and 4B. Short preamble frames are permitted for 802.11b, 802.11g, and 802.11n, for example, however beacon frames which are the packets of interest in the present invention must be transmitted with long preamble of FIG. 4A.

The present invention is operative using a series of sequential preamble detection cycles, each preamble detection cycle consisting of a preamble detection interval followed by a sleep interval. The preamble detection cycles are initiated during time intervals when a beacon frame is expected to be received, since the beacons are transmitted by a remote access point (AP) at regular intervals known to the station. Repeating preamble detection cycles comprising a preamble detection interval followed by a sleep interval, and the preamble detection cycles continue until a preamble is detected, at which point power remains applied to the receiver and PLL components through the subsequent preamble processing interval and baseband processor packet demodulation and packet header extraction until it is determined whether a packet is to be received by the STA (typically by a match between the MAC destination address field and the station MAC address). If preamble detect is asserted, power remains applied to the receiver and PLL until the packet is received. If no preamble is detected during the beacon time interval of preamble detection cycles, or the packet is not destined for the STA, the receiver is powered off. Alternatively, power may be selectively applied only during specific fields of the beacon packet, including the source address field and TIM bitmap field of the beacon frame. In another example of the invention for use with beacon frames, the preamble detector is cyclically operative during preamble interval cycles during a window of time when a beacon frame is expected.

A PLL settling time prior to each preamble detection interval, the PLLs are powered on by the assertion of PLL_Power for a PLL settling time after which the clock signals distributed through the receiver are stable and the mixer and other components can operate successfully.

The preamble detection interval refers to the interval when power is applied to the receiver, including any required preamplifier, mixer, low pass filter, analog to digital converter (ADC), preamble detector, and baseband processor, and the sleep interval refers to the subsequent interval when power is removed from the receiver and preamble detector. During the preamble detection interval, the receiver, preamble detector, and preamble processor have power enabled by the signal RX_Power, and during the preamble sensing interval, the preamble detector performs AGC and detects the presence of a preamble during the preamble sensing interval. If a preamble is detected, power remains applied to a preamble processor which operates over a preamble processing interval, during which time center frequency offset, channel equalization, and rake training occur, but the preamble processing interval only occurs if a preamble detect occurs during the preamble sensing interval. In a first mode of the preamble detector, preamble detection occurs for a comparatively long interval sufficient to assure less than 0.1% false preamble detection rate, such as by using a comparatively high preamble detection threshold or a longer preamble detection interval. In a second mode of the preamble detector, preamble detection occurs using a series of comparatively short preamble detection intervals, the shortest interval being sufficiently short and used with a cross correlation peak threshold sufficient to incur a 1% or greater false preamble detection rate, typically the threshold is set for a 20% false preamble detection rate (also known as a false alarm rate, or FAR), such as by using a comparatively lower preamble detection threshold to the accumulated cross correlation peak result, resulting in a high FAR, rather than the high preamble detection threshold with longer processing time and greater power dissipation but comparatively lower FAR. Prior to the preamble detector or preamble processor becoming operational after application of power, there are several sources of initialization delay, each with a separate time constant, but these initialization delays are associated with the receiver being in an operative state to receive any incoming beacon frame preamble, which requires the clock distribution be settled and stable, which is associated with phase lock loop (PLL) settling time for a multiplied clock provided to the receiver or preamble detector after application of PLL_Power to the PLL circuits.

FIG. 1 shows wireless devices 116 operating in 802.11 WLAN infrastructure mode including access point AP1 108 and associated stations STA1 102, STA2 104, STA3 106 STA4 110, STA5 112, and STA 6 114, which are associated to the access point AP1 108 according to the WLAN association procedure of IEEE 802.11, either by passive association, where the STA joins the AP via an association request, or by an active association, whereby the STA joins the AP using a probe command, as described in 802.11. Nearby stations STA 7 134, STA8 136, STA9 138 are associated with access point AP2 132 which is also operating in an IEEE 802.11 infrastructure network 130 unrelated to infrastructure network 116.

Figure 2:
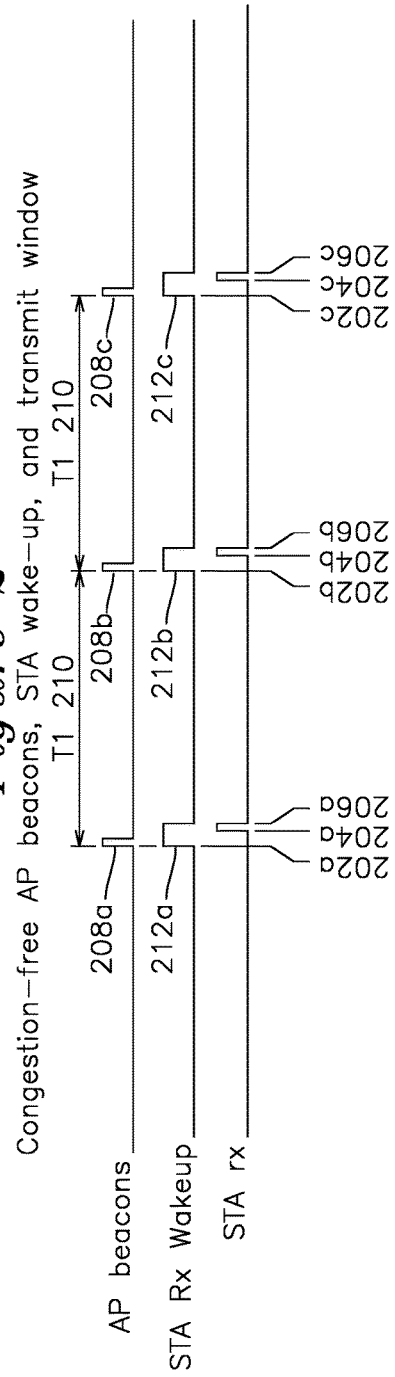
FIG. 2 is a timing diagram for a station operating in infrastructure mode with an access point.

FIG. 2 shows a timing diagram for a communications protocol of a wireless local area network access point such as FIG. 1 AP1 108 operating with an example station STA1 102. Periodic beacon frames 208a, 208b, 208c, etc. are transmitted a uniform time interval T1 210 from each other. According to the IEEE 802.11 WLAN power-save protocol, the station wakes up at intervals 212a, 212b, and 212c, and the WLAN station receives frames, and if the station STA has any frames to transmit, does so during the DTIM partition of the beacon frame, shown at indicated times 204a, 204b, 204c, etc. The operation of FIG. 2 provides great efficiency in power consumption, as the STA receiver uses internal circuitry to generate a wakeup signal, and it is only consuming power when powered up for transmit/receive operations. FIG. 2 shows a STIM interval of 1 (powering up once for each beacon), but the STA may elect to power up once every several beacons, as identified in the DTIM header and map.

Whereas FIG. 2 shows a best-case scenario without interferers or congestion, FIG. 3 shows the reduction in power-save mode efficiency when interference from non-associated stations or an unrelated AP which operates on the same channel is present. The access point 108 of FIG. 1 sends beacon 310 of FIG. 3 with the intention of sending the next beacon 322 after interval T1 301. However, because of interference from non-associated stations 134, 136, 138 and access point 132 sharing the same channel, WLAN packet 320 is unsynchronized with AP beacons 311 since it is not part of the infrastructure of the AP generating beacons 311 of FIG. 3. Another source of delay is clock accuracy. A typical wakeup clock accuracy may be ±40 parts per million (PPM), which corresponds to 4 us over a 100 ms beacon interval, or 40 us for a 1s beacon interval. Accordingly, the wake-up time must be adjusted for beacon interval, clock accuracy, and congestion delays. The stations or access points generating unrelated traffic are known as an interferers, which triggers the transmission back-off mechanism of IEEE 802.11, which delays the transmission of regular beacon 322 to time 324 to avoid interfering with the reception of WLAN packet 320. Through this back-off interval, the STA receiver remains awake from the expected beacon arrival 322 until its actual arrival 324, shown as STA_RX-_Power_On 326, remains asserted during extended window 328 until the channel is clear, at which time any receive packets 332 from the AP may be received and packets transmitted by the STA. An extended delay 343 is shown to occur on the subsequent beacon 340 arrival time, which is expected to occur a beacon interval T1 303 after previously transmitted beacon 324. The station takes note of the delayed beacon 340 arriving 348, and resets its wakeup timer to the expected arrival time of beacon 324 (with the delay T1 determined by the timestamp contained in each beacon), and asserts power-on 342, enabling all receiver circuitry in preparation for the next beacon. However, because of additional adjacent-channel interferers 341 or clock variations, the beacon 348 is additionally delayed, and the STA_RX_Poweron signal 343 is also extended, during which time receiver power is being consumed, but a packet has not arrived to be received until the end of the interval at time 346. During this entire extended interval 343, the station WLAN receiver circuitry remains enabled and consuming power, which is the primary problem of power saver operation in a congested network or networks with channel interferers.

FIGS. 4A and 4B show 802.11 WLAN packet frame formats. FIG. 4A shows a long preamble packet 402, which comprises, in sequence, 144 bits of preamble 404 at 1 MBPS using Differential Binary Phase Shift Keying (DBPSK) modulation, followed by 16 bits of start of frame delimiter 406, followed by 8 bits of signal 408, 8 bits of service 410, a length field 412, a CRC 414 which operates over the header, and the payload 416. Beacon and control frames are transmitted using 1 MBPS payload modulation, and these legacy packet types (in an era of modern WLAN equipment driven by higher data throughputs of IEEE standards 802.11b, 802.11g, and 802.11n higher throughput modulation methods) are transmitted using long preamble only, as required by the IEEE 802.11 standard. FIG. 4B shows a short preamble packet for use with higher data rate (greater than 1 MBps non-beacon frames), which was developed with the deployment of 802.11b, 802.11g, and 802.11n, where the preamble is shortened to 72 bits at 1 MBPS DBPSK, with the remainder of the WLAN fields being the same (other than modulation type for each field), as indicated by the identical identifiers as used in FIG. 4A. Since the first release of IEEE 802.11b, stations have been required to be operative with either short (56 bit) or long (128 bit) preambles.

FIG. 7 shows the block diagram of a receiver which is operative according to one example of the invention. Power is furnished by battery 724 where the design objective of the receiver station 700 is to maximize battery life through minimal power consumption. The station 700 is operative in an IEEE 802.11 infrastructure using beacon frames with DTIM, and wakes up prior to when a beacon frame is expected to arrive. Wireless packets are received and transmitted on antenna 702, but for clarity, only the receive components of the system are shown in FIG. 7. Wireless packets received on antenna 702 are directed to a preamplifier 704 where they are amplified, passed to mixer 706 for quadrature baseband conversion, filtered by low pass filter 708, and digitized by analog to digital converter (ADC) 710, after which a preamble is detected 712 for an exemplar preamble sensing time of 10 us (for an exemplar channel free of multipath or interference, or 20 us for high multipath or an interfering channel) during which time AGC is performed and preamble detect is asserted. If preamble detect output from 712 is asserted, preamble processor 714 is operative for an incremental exemplar preamble processing time of 28 us after preamble detect assertion 712, during which time channel estimation, center frequency offset, and rake training are performed, each of which is used by the baseband processor 716, which is not powered on 715 unless preamble detection occurs. If the arriving frame is a valid packet such as part of the expected beacon frame, the packet is sent to a baseband processor for demodulation 714. A power controller 718 applies power 720 to the phase lock loop (PLL) and clock distribution 716 prior to the arrival of the expected beacon frame for the clock signals to settle, and shortly afterwards, Rx power 722 to the remaining receiver components is applied. Baseband processor 717 is separately powered through switch 715, which may be enabled after preamble detection occurs.

Figure 5:
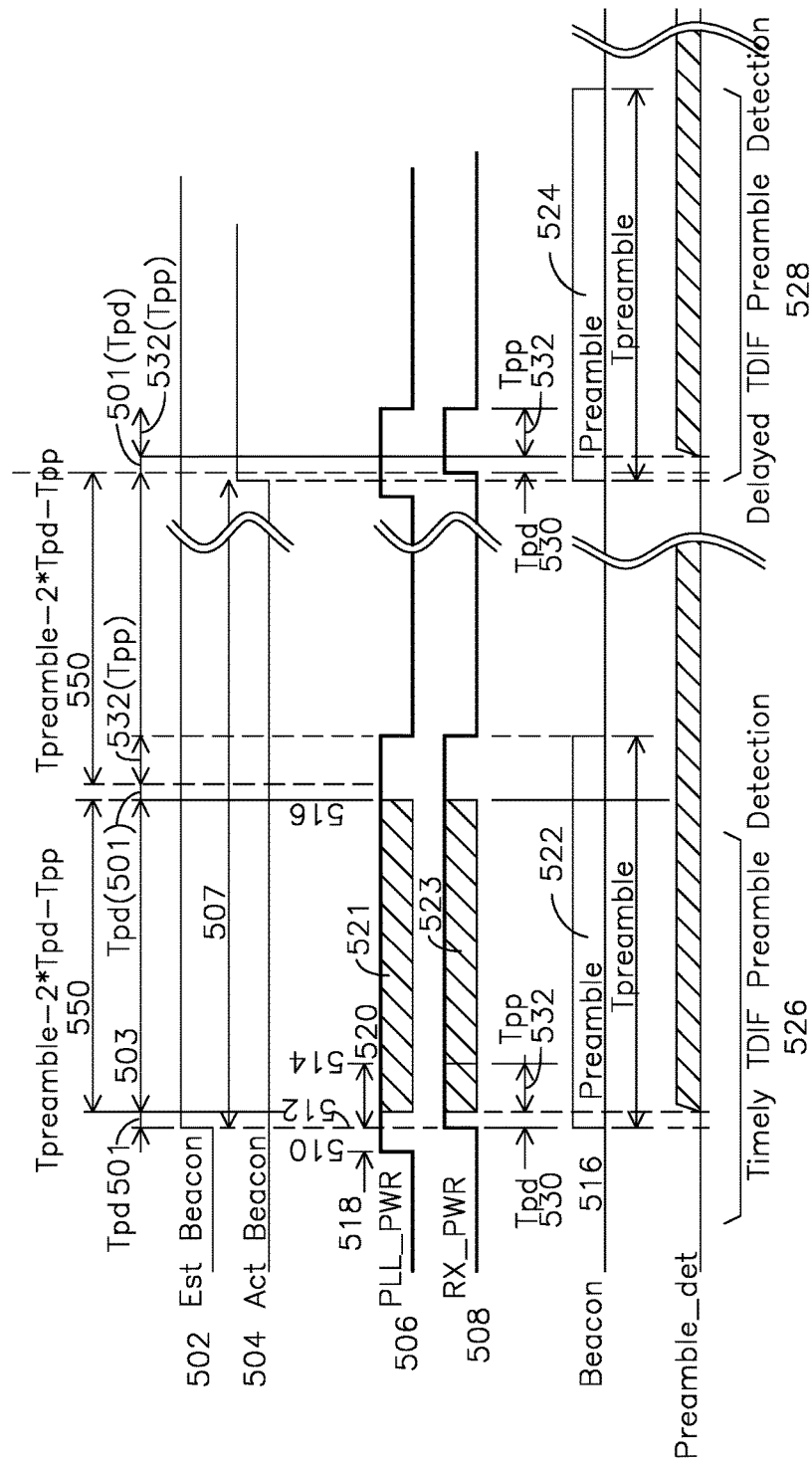
FIG. 5 is a timing diagram for a receiver preamble detection.

FIG. 5 shows the timing rationale for the receiver preamble detection apparatus and method such as was shown in FIG. 7. A long PLCP preamble such as from a beacon frame is 128 microseconds long (128 bits at 1 MBPS), each microsecond having an associated 11 bit Barker code chip, with the PLCP preamble terminated by a 16 bit start of frame delimiter (SFD), each bit of the SFD similarly formed by an 11 bit barker code chip. An exemplar preamble detector is operative in a first mode where the preamble detector has a high preamble detection threshold, the preamble detector typically requiring a preamble sensing or preamble detection interval Tpd of substantially 10 microseconds to perform AGC and detect preamble for high SNR or low multipath received signals, or 20 us for a high multipath signal or poor SNR, with an additional preamble processing time Tpp of 28 us to perform center frequency offset (CFO) correction, rake training, and tracking loop convergence, operations which provide prerequisite information used by the baseband processor to demodulate the packet and extract the payload information. The preamble detection Tpd intervals may be fixed length in the first mode of operation. In a second mode of operation where the preamble detector has a low preamble detection threshold operative over the accumulated peak cross correlation value and with a series of shortened preamble detection intervals, the preamble detector may utilize a lower threshold associated with a higher rate of false preamble detection for each shortened interval, thereby achieving Tpd of 10 us with greater than 1% rate of false preamble detection, and as high as, or higher than 20% false preamble detection rate. As the packet PLCP preamble is longer than is required for packet detection, the receiver and preamble detector may be powered on as shown by the bold line shown in the plot for Rx_Power 508 only during the preamble detection interval 530, and if a preamble is detected, RX_Power 508 remains applied through the preamble processor interval Tpp 532. The preamble detection interval 501, which is the maximum interval of time power is applied to the receiver if no preamble is detected, is equal to the preamble sensing interval Tpd. If a preamble is detected, a subsequent preamble sensing interval Tpp occurs. If preamble detect is not asserted at the end of the preamble sensing interval Tpd 530, PLL_Power and RX_Power are powered down and the sleep interval 503 follows, as shown by the hashed regions 521 and 523 for PLL_Power and Rx_Power, respectively. By careful selection of sleep interval 503 to allow two preamble detection intervals 501 plus a preamble processing interval which span the duration of the long preamble 522 of a beacon frame, and with specific knowledge of the receiver and preamble detector response time (provided as substantially 10 us in the present example) and preamble processing time (provided as substantially 28 us in the present example), if no preamble is detected during Tpd 530, it is possible to power-off the receiver during the preamble processing interval 532 and sleep interval 503, thereby assuring that a transmitted preamble from an AP beacon frame will not be missed, and the receiver need not be powered up continuously during this interval while waiting for the beacon frame to arrive. Because the reception of WLAN beacon packets is asynchronous to the Rx_Power signal 508, it is important to provide a minimum of two complete preamble detect intervals Tpd and one preamble processing intervals Tpp during a preamble 522 interval Tpreamble. Additionally, power to the PLL (PLL_Power) 506 is provided a PLL settling (Tpllsettle) time 518 prior to the preamble detection interval 501. An example Tpllsettle of 6 us is provided in the current examples for understanding the invention. The detection of a preamble enables power to the preamble processor and other components of the receiver until it is determined that a packet is to be received by the current station according to the received beacon DTIM station bitmap, or it is determined that no such packet is to be received, at which time the receiver is powered down until the next expected arrival 512 of a beacon frame.

Timely preamble detection shortly after the expected arrival of a beacon frame is shown 526, as well as delayed beacon frame packet detection 528 which occurs many preamble detect cycles after the estimate beacon arrival time 512.

FIG. 6A shows a timing example for the earliest possible preamble detection in a preamble detection cycle, with a preamble 602 arriving with sufficient time Tpd during the first preamble detection interval I1 to assert preamble detect 606 early in the cycle, and shows the subsequent preamble processing interval 608. FIG. 6B shows a timing example for the latest possible preamble detection of a preamble detection cycle, where the first RX_Power 624 assertion for the duration Tpd occurs too early in the preamble for preamble detect 626 to occur (and power is removed from the preamble processor during 628), but the preamble detect 626 is asserted Tpd after the second assertion of Rx_Pwron 624 during the preamble 620.

In one example embodiment of the invention, the PLL settling time 518 of FIG. 5 (governed by PLL lock time to provide a sufficiently stable clock signal for the receiver components such as mixers and ADCs to operate and sample uniformly) is 6 us representing 510 of FIG. 5, and Tpd 530 of FIG. 5 can be 10 us for good SNR, and low multi-path, or 20 us for multipath reflection, low SNR, or interference, and the Tpp operations of CFO, channel equalization, and preamble detection represented by 532 is 28 us, so the preamble detection interval 501 is 10 us in a first preamble detector mode (with low false detection rate) where the incoming signal presents with high SNR and low multi-path reflection, or 10 us in a second preamble detector mode (with high false detection rate) where the incoming signal presents with low SNR and high multi-path reflection. For a long preamble 522 of 128 us, the sleep interval 503 is 128 us−2*10 us−28 us=80 us. Since a late beacon arrival results in RX_Power only being cyclically applied for Tpd of 10 us over the interval of Tpd of 10 us plus the sleep interval of 80 us, the power consumption of the present invention when a beacon frame arrives late is therefore 10%=11% (less than ⅕th of the power) compared to the prior art method of leaving the receiver operative until a preamble is detected. Generally, the power savings is Tpd/(Tpd+Tsleep). By utilizing the first preamble detector mode for high SNR and low multipath reflection, and the second preamble detector mode for low SNR and high multipath reflection, Tpd may be preserved as 10 us in either high or low multipath signal conditions, providing advantageous power consumption. Since the false positive detection rate for a reduced threshold preamble detector will occur approximately 1 out of 10 preamble detection events, the total effect on power consumption remains quite small, since reduction of Tpd dominates the power savings, and a false preamble detect results in the subsequent failure to detect expected packet fields by the baseband processor 716 of FIG. 7, which results in the baseband processor asserting the entire receiver, preamble detector, and baseband processor return to a powerdown mode. Similarly, the PLL clock tree is only enabled for (Tpllsettle+Tpd)/(Tpd+Tsleep), or 16/90=17% or less than ⅕th of the prior art for power consumed during intervals of delayed beacon frames.

In multipath signal environments, it has been measured that Tpd is 20 us in the first detector mode (with high threshold) whereas Tpd can be reduced to 10 us by selecting a lower detector threshold with a higher false preamble detection rate in a second detector mode. The first detector mode may be associated with a rate of false preamble detection which is less than 0.1%, and the second detector mode may be associated with a rate of false preamble detection which is greater than 1%, typically on the order of 20% false preamble detection rate. As described earlier, the higher false preamble detection rate actually results in lower power consumption because of the infrequency of false preamble detection compared to the power savings associated with reducing Tpd when no detectable preamble is present using the shortened preamble detection interval. The hierarchical nature of dividing the preamble detection into a series of intervals and continuing to the next interval when the cross correlation peak exceeds a threshold ensures that the preamble detection is not adversely compared to the prior art method.

Figure 8:
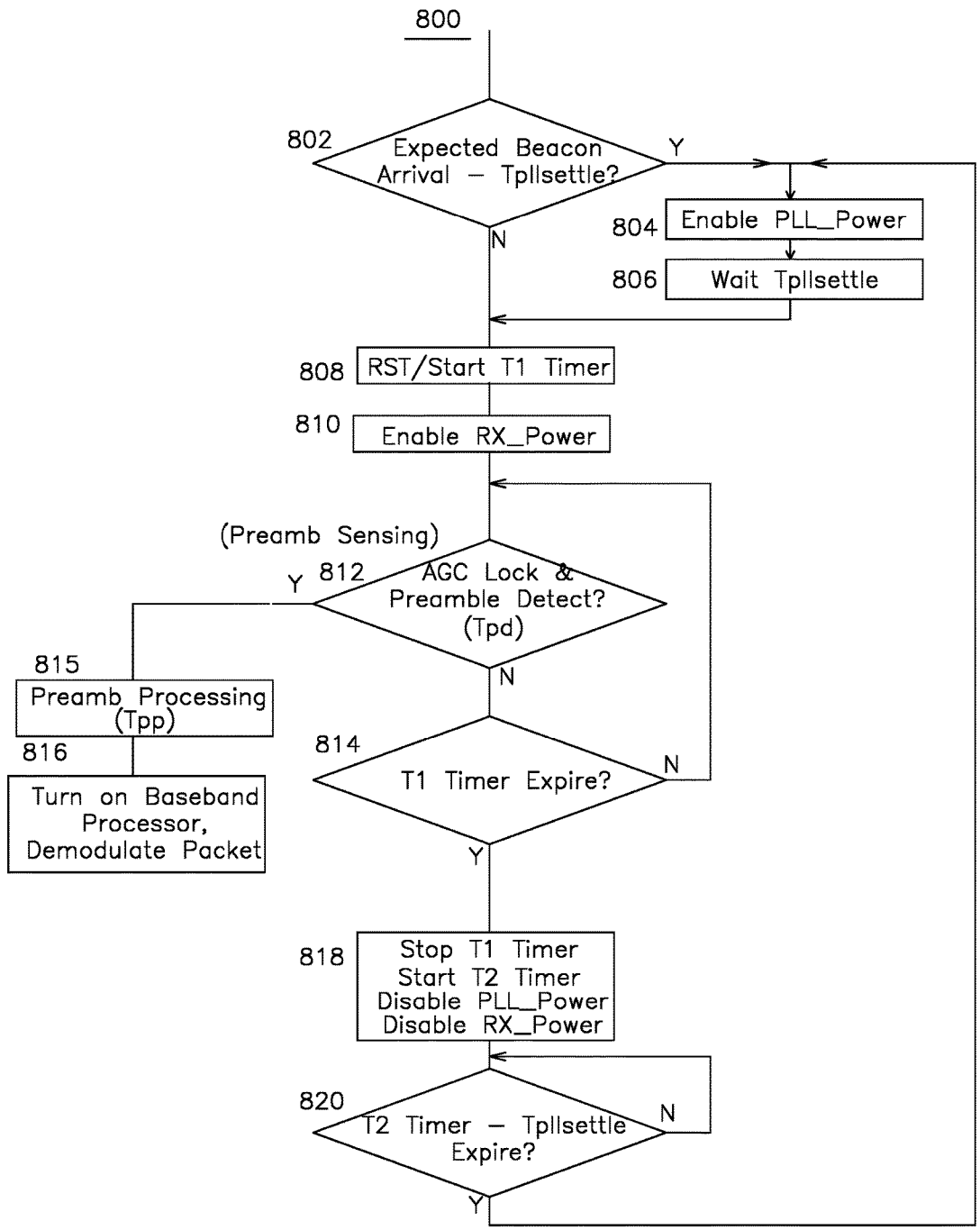
FIG. 8 shows a flowchart for a low power receive process for beacon packet detection.

FIG. 8 shows one example of the preamble detection of beacon frames as a process 800 of an example embodiment of the present invention. At step 802, a controller anticipates the expected arrival of a beacon by enabling PLL_Power 804 a PLL settling time Tpllsettle prior to the expected arrival of the beacon. After enabling PLL_Power 804, and waiting for PLL_Power to settle 806, a T1 timer 808 is started and RX_Power is enabled 810. A loop of checking for Preamble Detect 812 and T1 timer expiration 814 occurs until either a preamble detect is asserted leading to preamble processing 815 and packet demodulation 816, or in the case of timer T1 expiration where a preamble does not arrive during the Tpd interval, the sleep cycle of 818 and 820, during which sleep interval PLL_Power and RX_Power are removed. A PLL settling time Tpllsettle prior to the end of the sleep interval, PLL_Power 804 is enabled shortly prior to the next preamble detection cycle starting at step 808.

Figure 9:
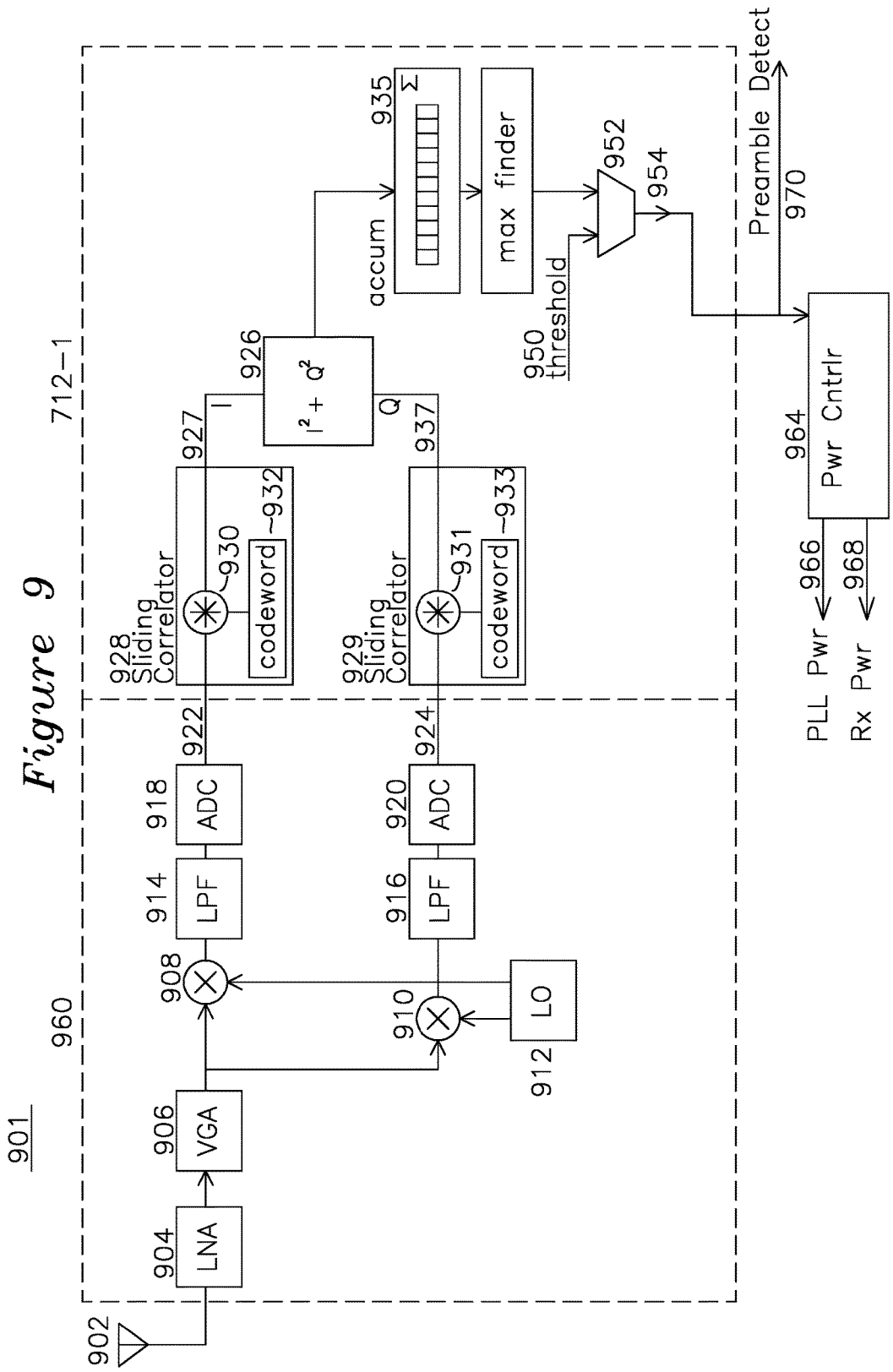
FIG. 9 shows the block diagram for a packet detector.

FIG. 9 shows a block diagram for a receiver and preamble detector 901. The front end block 960 accepts wireless signals from antenna 902 which receives wireless packets which include a preamble part modulated at a carrier frequency, the wireless packets are coupled to a low noise amplifier (LNA) 904 and a variable gain amplifier (VGA) 906 which adjusts the signal level to an optimum range of the dynamic range of the quadrature mixers 908 and 910, and also the optimum dynamic range of analog to digital converters (ADC) 918 and 920. Local oscillator 912 provides quadrature oscillation outputs (two oscillator outputs phase shifted 90 degrees with respect to each other) at the carrier frequency, thereby generating baseband quadrature mixer 908 and 910 outputs, which are coupled to low pass filters 914 and 916, respectively. The outputs of the low pass filters 914 and 916 are digitized by an in-phase (I) analog to digital converter (ADC) 918 generating I (in-phase sample) output 922 and quadrature (Q) ADC 920 generating Q (quadrature sample) output 924. The digitized I output 922 is applied to an I sliding cross-correlator 928, and the digitized Q output 924 is applied to a Q sliding cross-correlator 929. Each sliding correlator 928 and 929 performs a periodic sliding correlation of the respective incoming PLCP preamble symbol stream 922/924 against a preamble PLCP template 932/933. For an m-bit codeword 932/933 (such as an 11 bit Barker code), the sliding correlator performs a cross correlation over each of the m positions of the PLCP template codeword, forming a cross correlation of the codeword 932/933 with the received symbol pattern 922/924. Alternatively, the PLCP template may have each bit replicated once to generate a 22 bit code, and the sample rate doubled so that the sampled signal satisfies the Nyquist sampling rate and phase displacements between symbols and sample times provides better granularity for determining correlation peaks. Each respective I and Q bit position of the correlation result from 928 and 929 is then squared and summed 926 to form a magnitude value for each correlation sample of the 11 (or 22) sample output. The squaring and summing 926 of the correlator outputs removes the frequency and phase offsets associated with the sliding correlators operating on analytic signals where the center frequency offset has not having been computed or removed, as is performed later during baseband processing of the packet payload and after the preamble is detected. The correlation result of each bit position 1 through m (m=11 for Barker code, or m=22 if sampled twice per bit to accommodate for phase offsets) is added to an associated accumulated bit position in result accumulator 935, which takes the current accumulator result (11 bits for 1× sampling, 22 bits for 2× sampling), and adds the current correlation value coherently to the previous correlation results. As noise adds incoherently, whereas the correlation results will have a correlation peak in the same position each accumulation cycle, the signal peaks will grow after each accumulation cross-correlation compared to the noise. The accumulator 935 is reset at the beginning of each preamble detection cycle, and synchronously accumulates the sliding correlator result for each successive preamble in the stream, each preamble correlation peak adding to a previous correlation peak at an associated corresponding bit position. In this manner, the Barker preamble chip or codeword generates a stationary peak in a single location of the correlation accumulator, and the other cross correlation values outside of the central correlation peak tend to add incoherently. In the case of multipath reflection, multiple shifted weaker copies of the preamble may arrive and appear in the correlator output as time shifted preamble peaks. The accumulator 935 thereby generates a series of such preamble correlation peak responses, typically a maximum peak from a directly received signal, and a lower peak from a reflected signal delayed in time by multipath delay. A threshold detector 952 is operative with an externally applied threshold 950 where the threshold may increment for each successive accumulation. In one example of the invention, the threshold detector 952 forms a sum of k correlation peak responses (for the case of multipath reflection with an original response and k−1 delayed reflections) and divides this sum by the sum of total surrounding signal values to establish whether to proceed as the threshold comparison result, or alternatively divides by the total signal values less the k peak responses previously identified to establish whether to proceed as a threshold comparison result. In another example of the invention, the largest peak (corresponding to a barker code correlation peak) is compared 952 to either the second highest peak, or to the noise floor. Using any of these methods, or a combination thereof, the threshold detector generates a preamble metric, which is then compared with a threshold 950 according to one of the previously described thresholding methods (comparing to a noise baseline, to a second or secondary highest accumulator amplitude peak values, or to a predetermined interval-dependent threshold).

Figure 9A:
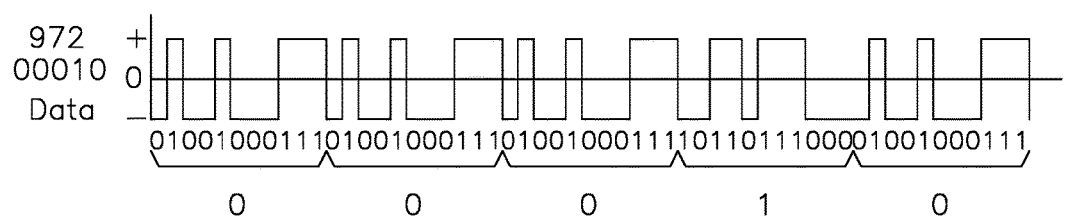
Figure 9B:
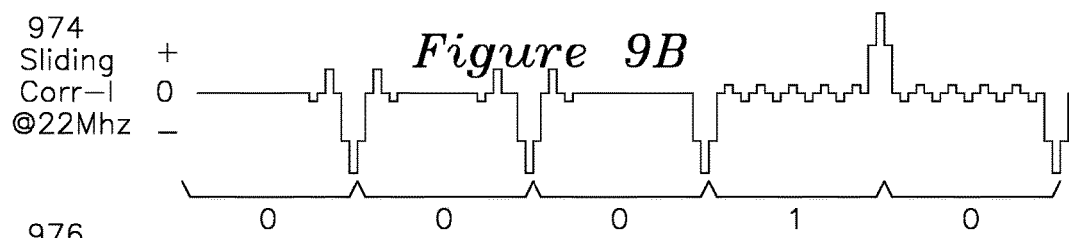
Figure 9C:
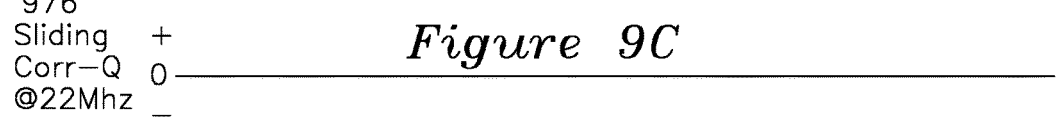

FIG. 9A shows a time-domain plot for a data stream 972 barker code sequence for sequential values 00010, and waveforms 974 of FIG. 9B and 976 of FIG. 9C show the I and Q channel correlations, respectively, at 22 Mhz (two samples per Barker code bit). FIG. 9D 978 and FIG. 9E 979 show the same I and Q correlation results with a post-cursor (having a main correlation accumulator peak 973 followed by a lower amplitude subsequent peak 975 caused by multi-path reflection as shown in plot 978). FIG. 9F plot 980 shows the values in the preamble accumulator over time, showing the growth in correlation peak over several cycles, compared to the noise floor. The accumulator may have a single linear accumulation register containing each bit position of cross-correlation as an accumulator result and which is reset at the start of the preamble detect process, and which has the linear array of values 986 of FIG. 9F accumulated over a first PLCP preamble cross-correlation, with peak values which constructively add on a second PLCP preamble as shown in interval 988, and continuing to add in interval 990, each interval corresponding to the length of a PLCP preamble, such that subsequent correlation peak values $I^2+Q^2$ increase coherently compared to surrounding incoherent noise. In the presence of multipath reflection, the accumulated correlation waveforms 980 has a main correlation peak 984 followed by multipath delay peak 982 of lower amplitude as previously described in FIG. 9D. In one example of the invention, variable threshold 950 may be adjusted to a higher value for more accurate packet detection at the expense of a longer packet detection time, or in another example of the invention, it may be adjusted to a lower threshold value for a less accurate but earlier packet detection, and corresponding reduced power consumption. The packet detect output 954 is asserted after several intervals where the accumulation peak result exceeds threshold 950. In the present preferred embodiment combining the periodic sampling of FIG. 5, it is desired to shorten the Tpd 501 of FIG. 5 listening interval during which power is consumed when no signal (or low likelihood of signal) is present. In contrast to the prior art, a packet detection threshold corresponding to a high false alarm rate is selected and used in combination with a hierarchical preamble sampling interval which selectively continues preamble detection only when a high likelihood of preamble detection is present from previous preamble detection interval. During the preamble sampling time, if the correlation peaks are below a threshold setpoint, the packet detection terminates early, thereby shortening the time the preamble detect circuits are drawing power.

In another embodiment, the threshold 950 may be adjusted to a high threshold value for high SNR (or low multi-path or low interference conditions) or a low value for low SNR (or high multipath or high interferer) conditions. Generally, the invention provides an average power consumption ratio of approximately $$\frac{2T_{pd} + T_{pp}}{T_{preamble}}$$

compared to prior art preamble detection methods, with Tpd minimized by early powerdown if the preamble accumulation values for any subsequent interval are not satisfied. The result is to shorten the Tpd I1 of FIGS. 6A and 6B after a preamble detection interval where the cross-correlation peak value does not exceed a threshold (such as in the presence of noise, high amplitude multipath reflection, or a low SNR), and to continue applying power to the receiver and advancing to the next accumulation interval when the preamble detection threshold is crossed for each particular preceding interval. The shortening of Tpd when no preamble is present (and removal of the Tpp cycle since no preamble is present) of FIGS. 6A and 6B advantageously further reduces the power consumption of the receiver compared to fixed sampling intervals during the preamble listen intervals of FIGS. 6, 6A, and 6B when no signal is present. In summary, it is unexpectedly beneficial to set the threshold for a higher false alarm rate (increased false packet detection) applied over a shortened preamble detection interval, combined with an early powerdown of the receiver when the preamble detection threshold is not crossed, and to continue preamble detection when the threshold is crossed for each interval, because the power penalty for maintaining the front end operative during a fixed Tpd interval for assuring a low false alarm rate is greatly offset by the power savings of using the result during a first detection interval to determine whether to use a subsequent detection interval and ultimately complete the preamble detection process if the threshold is crossed for all examined intervals.

FIGS. 10A, 10B, 10C, 10D, 11A, and 11B show an example method for reducing power consumption over a wide variety of SNR conditions for an example 40 us preamble interval (corresponding to 440 preamble bits, each bit being an 11 bit barker code chip as before) being detected by cross correlation where over a 5 us (55 barker code chips, using the example of 5 11 bit samples) with the threshold set for a high 20% false preamble detection rate which would be unacceptable in a conventional WLAN system. In prior art communications systems, the false preamble detection rate (also known as "false alarm rate" FAR) for a preamble detector is typically 1 in $10^4$ ($10^{-4}$) or less. In the present power saving method, the false alarm rate (FAR) is increased by several orders of magnitude, however, by examining increasingly longer segments of preamble and using a lower threshold associated with a greater false alarm rate, coupled with examining in succession each preamble detection interval, it is possible to provide a $10^{-4}$ FAR by shortening the preamble detection time when the preamble detection accumulator threshold is not met. In an example embodiment for 40 us of the 128 us of a long PLCP preamble of 802.11b or similar PLCP, the preamble detection is iteratively performed over a series of sample intervals, the start of each sample interval having these steps performed:

a) A preamble detection threshold is established for an FAR in the range of 1% to 50% (20% in the present example) for an example segment of PLCP preamble (5 us being used in the present example for illustration purposes)

b) Cross correlation is performed on the first interval of PLCP preamble comprising one or more PLCP symbols, accumulating each cross correlation result in a successive location of a linear array accumulator, each location corresponding to a bit position of a single PLCP preamble symbol of the interval (such as 11 position accumulator for an 11 bit barker code sampled at 11 Mhz, or 22 position accumulator for 22 Mhz sampling of the 11 bit barker code), and if the threshold for preamble detection is exceeded by the cross correlation peak result, the accumulator of the preamble detector continues into a subsequent interval, and if the threshold is not exceeded, the associated receiver powers down until the next sample interval.

c) If the threshold for detection is crossed in the first interval of PLCP preamble, then the preamble detector continues to operate and accumulate cross correlation results for an additional interval such as the sum of the first interval (such as 5 us) and second interval (such as 5 us) continuing to cross correlate and accumulate over the subsequent interval, and if the threshold for detection is exceeded by the correlation result at the end of the second interval 1006 (indicating detected preamble), the preamble detector continues into a subsequent interval, otherwise the associated receiver powers down until the next sample interval.

d) If the threshold for detection is exceeded at the end of the second interval 1006, then the preamble detector continues to operate and accumulate cross correlation results for an additional third interval (1006 to 1008) of preamble, and if the threshold for detection is exceeded, the preamble detector either asserts preamble detect, or continues for a subsequent fourth interval.

e) While the process may optionally continue with increasingly longer intervals until the complete 128 us of preamble has been correlated and examined, it is typically not necessary that to continue beyond the second or third interval spanning approximately 20 us for Tpd.

In another example embodiment of the invention, a preamble detector is operative at the start of a series of repeating sample intervals corresponding to Tpd of FIGS. 5, 6A and 6B, the preamble detector having a linear accumulator for storing the accumulated result of cross correlation of an incoming symbol stream with a template PLCP symbol, the accumulator having accumulated cross correlation result locations related to the number of bits in a preamble symbol length, the accumulator reset at the start of each sample interval, the preamble detector operative over a plurality of intervals, at least one subsequent interval longer than an earlier interval, the process comprising:

at the start of each preamble sample interval, the preamble detector operative over a first interval which is longer than a single preamble symbol, the preamble detector comparing the accumulator correlation peak value to a first interval threshold, and if the accumulator correlation peak value does not exceed the first interval threshold, powering down the preamble detector;

for any subsequent interval for which the accumulator peak correlation value does not exceed an associated interval threshold, powering down the preamble detector, and if the accumulator peak correlation value exceeds a corresponding threshold at the end of a final interval, asserting preamble detect if the correlation peak exceeds the corresponding interval, or powering down without asserting preamble detect if the correlation peak does not exceed the corresponding interval threshold.

It is understood that the term "cross-correlation peak value" is the maximum value resulting from the accumulation of previous cross-correlation operations, and an interval threshold may be formed from any of: the peak value of the correlation result accumulator is greater than any non-peak value, the peak value of the correlation result accumulator is greater than a second or third greatest peak value, or any comparison of the peak value to any other peak or non-peak value different than the peak value. Accordingly, the interval threshold may be set from the noise level of surrounding non-peak values, or the interval threshold may be established from an average value of one or more of the secondary peak values which are less than the maximum peak value.

The first interval, second interval, and any subsequent interval each have a duration which is a multiple m of a Barker code sequence having a duration B in time such that m*B<half of a preamble duration of 128 us, or 64 us. Typically, the first interval is approximately equal to the second interval, and the third interval is equal to the sum of the first and second intervals, and an optional fourth interval is the sum of the duration of the intervals which precede it. In this manner, each interval from start to finish has a duration equal to the duration of time from the start of the first interval to the start of the current interval, thereby doubling each sample interval from start to the end of a particular interval with respect to previous intervals.

FIG. 10A shows an example for 802.11b PLCP preamble with a first 5 us interval from 1002 to 1004, a second 5 us interval from 1004 to 1006, a third PLCP interval from 1006 to 1008, and a fourth PLCP interval from 1008 to 1010, as previously described. FIG. 10B shows the hierarchical decision tree and false alarm likelihoods given a threshold set to correctly detect 80% of the PLCP preamble fragments and to false alarm detect 20% of the PLCP preamble fragments. From 1002 to 1004, the first 5 us of the PLCP are cross correlated and accumulated into a register indicating each bit position of the correlation result for a single barker chip sequence, as shown in FIG. 9F, which would result in a false preamble detection 1022 20% of the time for the desired threshold 950. If the peak accumulation does not exceed the example 20% FAR threshold, the packet detection stops and the preamble detector powers down. If the accumulator peak exceeds the example 20% FAR threshold, the preamble detection continues to a second 5 us interval from 1004 to 1006. At the end of the second interval 1006, using the threshold for a FAR of 20% over 5 us, the FAR is 0.2*0.2, or 4%. If the correlation peak value does not exceed the second interval threshold for the 5 us second interval at the end of the second interval at 1006, the preamble detector powers down, otherwise the third interval of an example 10 us duration is entered and completed at time 1008, and if the third interval threshold is exceeded, packet detect is asserted, otherwise the preamble detector powers down. The false detection rate at the end of the third period is then $0.2^{\wedge}4=0.16\%$, which is an adequate false packet detection rate. Alternatively, at the end of the third interval 1008, if the correlation peak exceeds the third interval threshold, the preamble detector may enter a fourth interval of 20 us ending at 1010, with preamble detect asserted if the peak accumulated threshold exceeds a fourth interval threshold.

In this manner, the duration of time the preamble detector is enabled may be shortened when the preamble cross correlation peak is not above a threshold, indicating weak signal. Furthermore, by selecting a high false alarm rate threshold, and shortening the cross correlation time when it is unlikely to detect a preamble, significant power savings may be achieved with no reduction in false preamble detection, as the preamble detector will continue to 0.16% FAR at the end of the third interval at time 1008, or 0.0003% at the end of fourth interval at time 1010. The various false preamble detect outcomes are shown in groupings 1012, and the non-detection of preamble (correlation accumulation did not exceed threshold) is shown as outcome 1016. The preamble false alarm rate is shown in the table of FIG. 10C, where 5 us of preamble results in 20% preamble FAR, which falls to 4% in 10 us of preamble, and to 0.15% after 20 us of preamble, which should be sufficient in almost all circumstances. Optionally, it is possible to continue for an example fourth interval, with a 0.00003% false preamble detection after 40 us of preamble. A significant power savings comes about from disabling the preamble detect by comparing the cross correlation peak with a low threshold associated with a high FAR to determine when to stop the preamble detection early, thereby saving power by powering down the preamble detector.

FIG. 10D shows a computation for the average amount of time the preamble detector is enabled according to the method of FIGS. 10A and 10B. For the examples of FIGS. 10A and 10B, the average time the preamble detect (PD) circuit is enabled is then 100% of the time for the first interval 5 us, 20% of the time for the second interval of 5 us, 4% of the time for the third interval of 10 us, and 0.16% of the time for the fourth interval of 20 us. Multiplying this out for the example three intervals results in a 99.84% correct preamble detect, or for the example four intervals results in a 99.9997% successful preamble detect rate with an average preamble detect enable time of 6.432 us (compared to 5 us of PLCP with 80% preamble detect rate, or the prior art method of enabling the preamble detector for 40 us resulting in the previous 99.9997% preamble detect rate). Each preamble detect event is subject to stochastic variations, for the above examples with a given FAR=20 for a 5 us preamble segment, the average number of preamble bits for the preamble detector to be enabled before a detected preamble occurs and power down is asserted for a given FAR (0<FAR<1) using 5 us (5 11 bit barker code chip times) is:

$$\text{Avg\_pream\_time} = 5\ us + 5\ us^* FAR + 10\ us^* FAR^2 + 20\ us^* FAR^4$$

More generally for intervals which double with respect to start of the packet for each subsequent interval:

$$\text{Avg\_pream\_time} = Tint1 + Tint1^* FAR + 2^* Tint1^* FAR^2 + 4^* Tint^* FAR^4$$

where Tint1 is the interval time being doubled for each subsequent interval, and FAR is the false alarm rate (false packet detect rate) for the interval Tint1 alone.

FIG. 11A shows a series of probability density functions (PDF) on the y axis for a high SNR versus a decision threshold metric such as ratio of peak accumulated cross-correlation to average accumulated cross-correlation in non-peak areas on the x axis. Accordingly, the x-axis is not subject to an upper limit, and a reference metric of 0.2 118 is shown for comparison purposes. FIG. 12 may provide insight into the operation of the current invention in its most general form. Plots 1102, 1114, and 1104 show "noise only" probability density functions for preamble detection, with plot 1104 showing the result of more averaging (longer cross correlation accumulation) and plot 1102 showing less averaging (shorter cross correlation accumulation). Similarly, plots 1108, 1116, and 1106 show probability density functions for preamble detect signal+noise, for example the case where signal=noise, or 0 db Signal to Noise Ratio (SNR). Plot 1108 shows the result of less averaging (shorter cross correlation accumulation), and plot 1106 shows the result of more averaging (longer cross correlation accumulation). For a given threshold metric (such as threshold 0.2 1118 as shown) and a given amount of averaging (such as noise PDF plot 1114 or Signal+Noise PDF plot 1516, the area 1110 below the noise only plot 1114 represents the false alarm rate (FAR), where noise with no associated preamble signal has caused the preamble detector to incorrectly assert preamble detect, and the area 1112 below signal+noise plot 1116 which is below threshold 1118 represents the missed detect rate (MDR), representing preamble signal that was not detected because it fell below the threshold level. In the description of operation for the present invention, a threshold 1118 associated with the threshold 950 of FIG. 9A which results in a 20% false alarm rate (FAR) of preamble detect output 954 for a 5 us PLCP preamble sequence in a series of 5 802.11 Barker code preamble sequences such as would be found in a beacon frame preamble. FIG. 11B shows the same plots for a high SNR, with a greater separation in Signal+Noise PDF from the noise only PDF curves and bounded areas as described in FIG. 11A.

FIG. 12 shows an example preamble detection process where step 1202 establishes the packet detect threshold based on an exemplar 20% FAR over the first interval such as 5 us, and the first 5 us of preamble are cross correlated in step 1204. The cross correlation of the first 5 us of the preamble result in a cross correlation peak value in step 1204. If the cross correlation peak does not cross the first interval threshold in step 1206, the preamble detector powers down 1222 until the start of the next sample interval, otherwise the process continues and the next 5 us of the preamble are cross correlated and accumulated 1208, and a peak value is found and compared to the second interval threshold in step 1210. If the peak cross correlation accumulator value does not exceed the second interval threshold, the preamble detector powers down in step 1222, otherwise the cross correlation and accumulation continues for the next 10 us in step 1212, and the accumulated cross correlation peak value is compared to the threshold in step 1214. If the peak values is below the third interval threshold, the preamble detector powers down in step 1222 until the next sample interval, otherwise preamble detect may be asserted at this point (corresponding to the 0.16% FAR (or 99.84% correct packet detection) of FIGS. 10A and 10C). Alternatively, the process may continue in step 1216 with a fourth interval of cross correlation and accumulation, resulting in a peak value which is compared to a fourth interval threshold in step 1218, resulting in either the assertion of preamble detect in step 1220 (with 0.00026% FAR or 99.99974% correct packet detection), or powerdown in step 122 with no preamble detection.

The examples of the present invention are shown for illustration only, and are not intended to limit the scope of the invention to only those examples described. For example, there are many different time durations associated with AGC lock, CFO estimation, channel estimation, and preamble detection. The example PLL settling time of approximately 6 us, the example packet detection which includes CFO, Rake training, channel estimation, and packet detection may be approximately 28 us. A duration of "approximately" x is understood to be in the range ½x to 2x. Substantially is understood to be in the range of +/−50% of the nominal value.

I claim:

1. A preamble detector operative during repeating preamble detection intervals, the preamble detector receiving an in-phase baseband channel signal and a quadrature baseband channel signal and generating a packet detect output, the preamble detector forming an array of values for accumulation, the array of values comprising the individual results of summing a squared in-phase correlation and a squared quadrature correlation, the in-phase correlation formed by cross correlating the in-phase baseband channel signal with a template PLCP, the quadrature correlation formed by cross correlating the quadrature baseband channel signal with the template PLCP, the length of the template PLCP being equal to the length of a preamble PLCP on either the in-phase baseband channel or the quadrature baseband channel;
   at the start of each preamble detection interval, resetting an accumulation register, thereafter accumulating each array of values into the accumulation register, the accumulation register having a peak value greater than other accumulation register values, the peak value compared with a first interval threshold during a first interval;
   if the peak value does not exceed the first interval threshold, powering down the preamble detector, and if the peak value exceeds the first interval threshold, continuing to accumulate each array of cross correlation values into the accumulation register for a second interval, thereafter comparing the peak value of the correlation register with a threshold;
   if the peak value exceeds the threshold, powering down the preamble detector until a subsequent preamble detection cycle, otherwise accumulating each array of values into the accumulation register for a third interval, thereafter comparing the peak value of the correlation register with a threshold;
   if the peak value exceeds the threshold, asserting a preamble detect output.

2. The preamble detector of claim 1 where at least one of the first interval or the second interval is a multiple m of a Barker code sequence having a duration B in time such that m*B<64 us.

3. The preamble detector of claim 1 where the accumulator stores 22 samples for a Barker code.

4. The preamble detector if claim 1 where the preamble detector is operative on a receiver having receiver elements powered by RX_Power and phase lock loop elements enabled by P Power, the preamble detector cyclically enabled by application of Rx_Power to provide a preamble detection cycle starting at the expected arrival of a beacon, the preamble detection cycle comprising:
   a preamble detection interval and a sleep interval, RX_Power being applied during a preamble sensing interval within the preamble detection interval and RX_Power not being applied to the receiver during the sleep interval, and PLL_Power being applied for a PLL settling time prior to the preamble detection interval as well as during the preamble detection interval;
   a detected preamble step where the RX_Power and PLL_Power remain applied upon detection of a preamble by the preamble detector and remaining applied until a packet detect is asserted or a timeout occurs;
   where the duration of the sleep interval is approximately equal to the preamble length minus the sum of two times the preamble detection interval plus the preamble processing interval.

5. The preamble detector of claim 1 where the preamble detector is enabled during intervals when a beacon frame is expected to occur.

6. An energy efficient preamble detector operative on a linear array of values, each value formed from the sum of the square of the cross correlation of an in-phase channel with a PLCP preamble plus the square of the cross correlation of a quadrature-phase channel over the duration of a PLCP preamble interval, the packet detector having an accumulator forming an accumulated sum of each linear array of values, the accumulated sum having a peak value which is compared to a threshold during a first interval equal to a first plurality of PLCP intervals, the accumulation continuing for a second interval if the threshold is not exceeded during the first interval, the accumulation continuing for a third interval if the threshold is not exceeded during the second interval;
   where the threshold is set for a false packet detection rate of greater than 1% and less than 50%, the packet detector asserting a preamble detect output and powering down the preamble detector for the remainder of the preamble if the threshold is exceeded.

7. The preamble detector of claim 6 where the PLCP preamble is a Barker code sequence of 11 chips.

8. The preamble detector of claim 6 where the duration of the first interval is a multiple of at least two Barker code chip intervals.

9. The preamble detector of claim 6 where the in-phase channel and quadrature channel are a sequence of 22 samples which have a duration equal to the duration of a Barker code.

10. The preamble detector of claim 6 where the first interval is approximately 5 us, the second interval is approximately 5 us, and the third interval is approximately 10 us.

* * * * *